United States Patent

[11] 3,557,303

[72] Inventors Harold O. W. Jordan
Stamford, Conn.;
Michael J. Keenan, Chappaqua, N.Y.;
Austin Ross, Monroe, Conn.

[21] Appl. No. 692,787
[22] Filed Dec. 22, 1967
[45] Patented Jan. 19, 1971
[73] Assignee Printing Developments, Inc.
New York, N.Y.
a corporation of New York

[54] CATHODE RAY TUBE SCANNING SYSTEMS WITH SPOT AND AREA SCANNING
37 Claims, 13 Drawing Figs.

[52] U.S. Cl. .......... 178/5.2
[51] Int. Cl. .......... H04n 1/00
[50] Field of Search .......... 178/5.2, 5.2A, 5.4, 6.7

[56] References Cited

UNITED STATES PATENTS

| | | | |
|---|---|---|---|
| 2,892,016 | 6/1959 | Hall | 178/5.2(A) |
| 3,128,333 | 4/1964 | Loughlin | 178/5.2(A) |
| 3,194,883 | 7/1965 | Ross | 178/5.2(A) |

*Primary Examiner*—Robert L. Griffin
*Assistant Examiner*—Richard P. Lange
*Attorney*—Brumbaugh, Graves, Donohue & Raymond

ABSTRACT: Electromechanical color separation exposing systems in which original is scanned by spot from cathode ray tube and reproduced local contrast is improved by modifying main path scanning signals from spot by signal derived from scanning of original in an area around normal spot position. Spot scans in area by intermittent angularly displaced radial scans or radially displaced spiral sector scans or by being intermittently defocused or subjected to noise deflections in two directions. Concurrent main path and area scannings are effected by a two beam tube. System may be extended to employ a knockout mask scanned by an additional cathode ray tube synchronously with the main path scanning of original by the first tube.

INVENTORS
HAROLD O. W. JORDAN,
MICHAEL J. KEENAN &
BY AUSTIN ROSS

INVENTORS
HAROLD O. W. JORDAN
MICHAEL J. KEENAN &
AUSTIN ROSS
BY

INVENTORS
HAROLD O. W. JORDAN,
MICHAEL J. KEENAN &
BY AUSTIN ROSS

INVENTORS
HAROLD O. W. JORDAN,
MICHAEL J. KEENAN &
BY AUSTIN ROSS

INVENTOR.
HAROLD O. W. JORDAN,
MICHAEL J. KEENAN &
BY AUSTIN ROSS

INVENTORS
HAROLD O. W. JORDAN,
MICHAEL J. KEENAN &
AUSTIN ROSS
BY

INVENTORS
HAROLD O. W. JORDAN,
MICHAEL J. KEENAN &
AUSTIN ROSS
BY

INVENTORS
HAROLD O. W. JORDAN,
MICHAEL J. KEENAN &
BY AUSTIN ROSS

CATHODE RAY TUBE SCANNING SYSTEMS WITH SPOT AND AREA SCANNING

This invention relates generally to image translating systems wherein a visual image is scanned and the image tone values detected by such scanning are converted into electric signal values. More particularly, this invention relates to systems of such sort wherein the visual image is scanned by cathode ray tube means. The exemplary embodiments of the invention which are described herein are systems for electrically deriving color separations from a scanned color transparency or other color copy. It is to be understood, however, that the invention has other applications as, say, in black and white or color television.

An electronic system for obtaining color separations from a color original is commonly known as a "scanner." In a conventional scanner, the original color transparency or "copy" is mounted in front of a stationary white light beam and on a drum which is rotated and axially moved to produce a scanning in a raster pattern of the copy by the light beam. The beam is modulated in intensity by the tone values of the copy detected by the scanning. Thereafter, the modulated white beam is split into three primary color component beams from which are derived three corresponding color component electric signals. Those signals are processed in a computer which, among other things, operates to provide a "black" signal in addition to the three chromatic color component signals.

The resulting four signals control the intensity of four corresponding image-exposing stationary light beams of which each falls on a respective one of four sensitized photographic film sheets mounted on the same drum as the copy such that each exposing beam is caused (by the rotary and axial movements of the drum) to scan the corresponding sheet in a raster pattern the same as that by which the original copy is scanned. In that manner, three chromatic color separation images and a black separation image of the original are exposed on the four sheets.

It is often necessary that the size of the separation images be different from the size of the original image. In, however, a standard scanner system wherein the scanning of the original is produced in the described mechanical manner, practical problems of mechanical and optical nature are encountered in attempting to provide an enlargement ratio other than 1:1, and those problems are aggravated where different image scanning cycles require different values for that ratio so that such ratio must be selectively variable at the will of the operator.

Accordingly, it has been proposed that (a) the original copy be held stationary in front of a cathode ray tube to be illumined by a light spot from the electron beam of the tube, and (b) such beam be subject to orthogonal X and Y deflection movements synchronized with and proportional to, respectively, the rotary and axial movements of the drum so as, thereby, to produce a scanning of the copy by the spot in a raster pattern of the same shape as the patterns by which the photographic sheets on the drum are scanned. Such cathode ray tube scanning of the original overcomes the problem of providing a selectively variable enlargement ratio because the proportionality factor between the amounts of rotary and axial movements of the drum and the responsive amounts of the X and Y deflection movements of the electron beam can be easily varied by merely readjusting the setting of the X and Y deflection gain controls of the tube.

U.S. Pat. No. 3,194,883 (granted Jul. 13, 1965 in the name of Austin Ross) discloses a system for producing color separations in which mechanical movements are employed to produce a scanning pattern for an original which is scanned both by a flying light spot and by an illuminated area surrounding that spot. Separate electric signals are derived from such spot and area scannings. The signal from the area is utilized to modify the image signals from the spot in a manner to selectively increase in the ultimately obtained reproduction the contrast contained between a localized tonal detail and the tonal surroundings of that detail as compared to what such contrast would be if no area signal had been used.

The teachings of that patent concerning the use of the area signal are relevant to the present invention and will be relied on herein, wherefore, that patent and the patents referred to therein are to be considered incorporated herein by reference. On the other hand, the teachings of the Ross patent for producing an area scanning by mechanical methods are not applicable to scanner systems in which the original is scanned by a cathode ray tube.

It is, accordingly, an object of this invention to provide scanner systems and other image-translating systems in which an original visual image is subjected to scanning in a main path by a spot produced by cathode ray tube means, and one or more replica images of the original are derived from such main path scanning and are controlled or modified in tonal content by one or more auxiliary signals derived from another scanning effected by cathode ray tube means.

A further object of this invention is to provide systems of the sort described in which the one or more replica images are modified in tonal content by auxiliary signals derived from a scanning by cathode ray tube means of the original visual image in an area surrounding the mentioned spot.

A still further object of this invention is to provide systems of the sort described in which the one or more replica images are controlled in tonal content by an auxiliary signal derived from the scanning by cathode ray tube means of a knockout mask.

For a better understanding of how these and other objects of the invention are realized, reference is made to the following description of exemplary embodiments thereof and to the accompanying drawings wherein.

Figure 1:
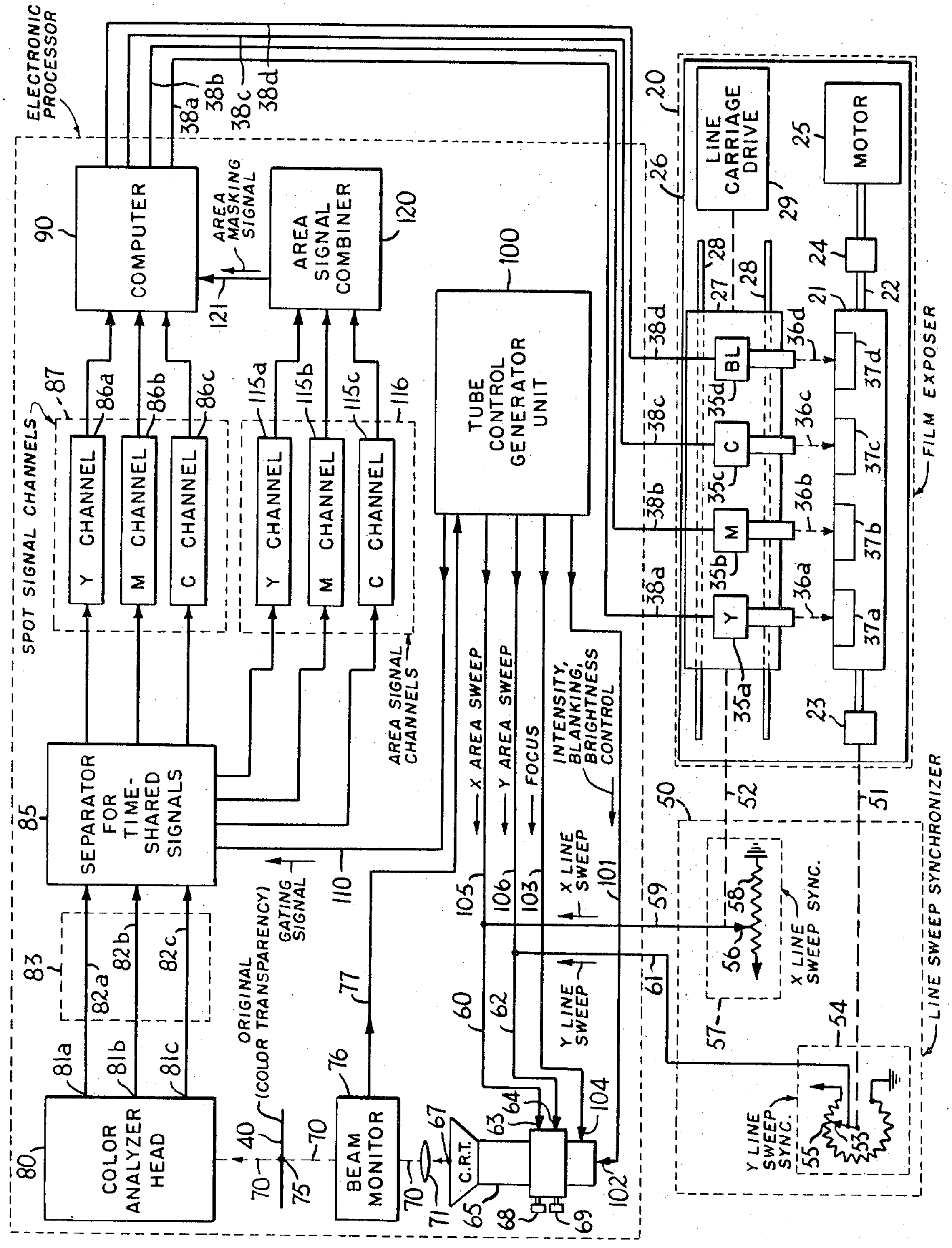
FIG. 1 is a block diagram of a scanner system according to the invention.
Figure 8:
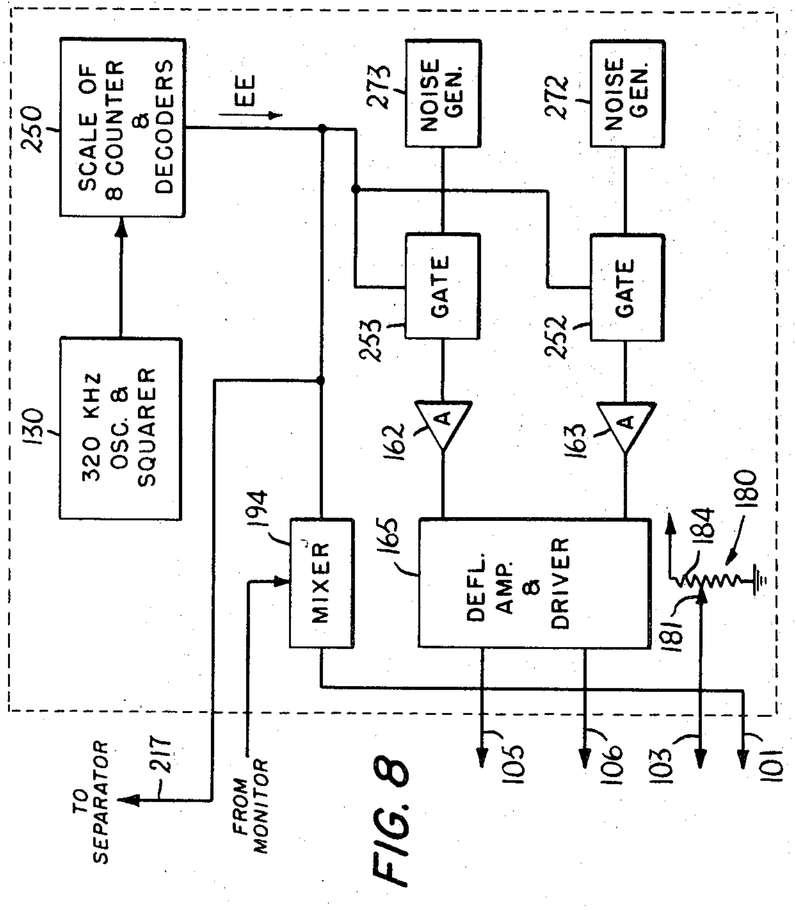
Figure 6:
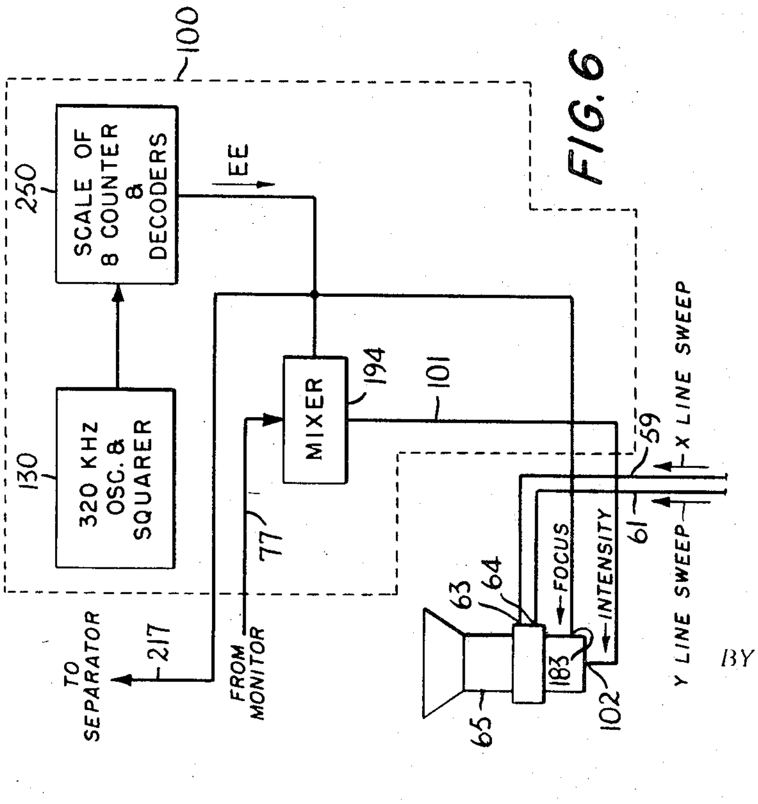
FIG. 6 is a block diagram showing a portion of a FIG. 1 system wherein area scanning is effected by defocusing.
Figure 10:
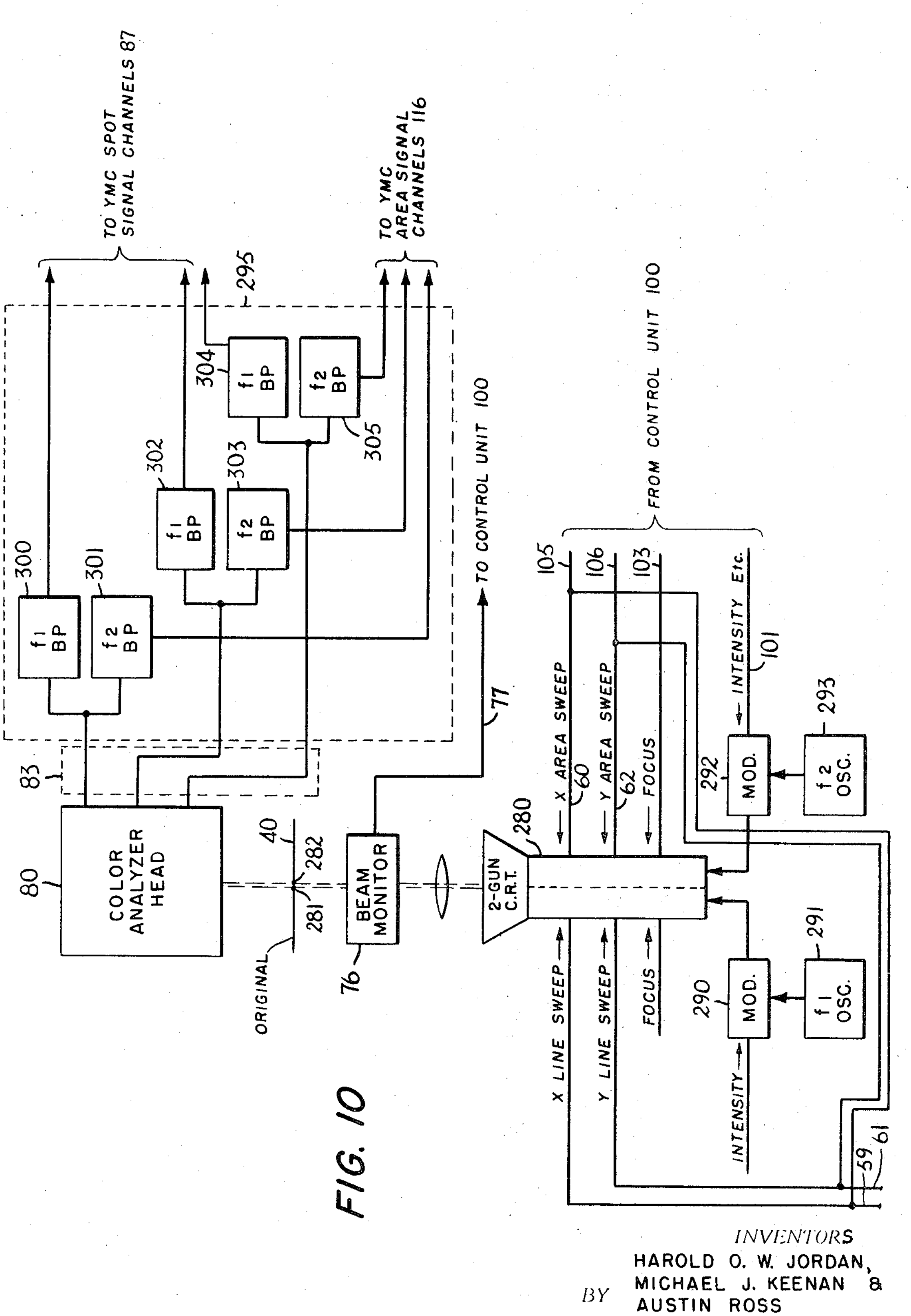
Figure 11:
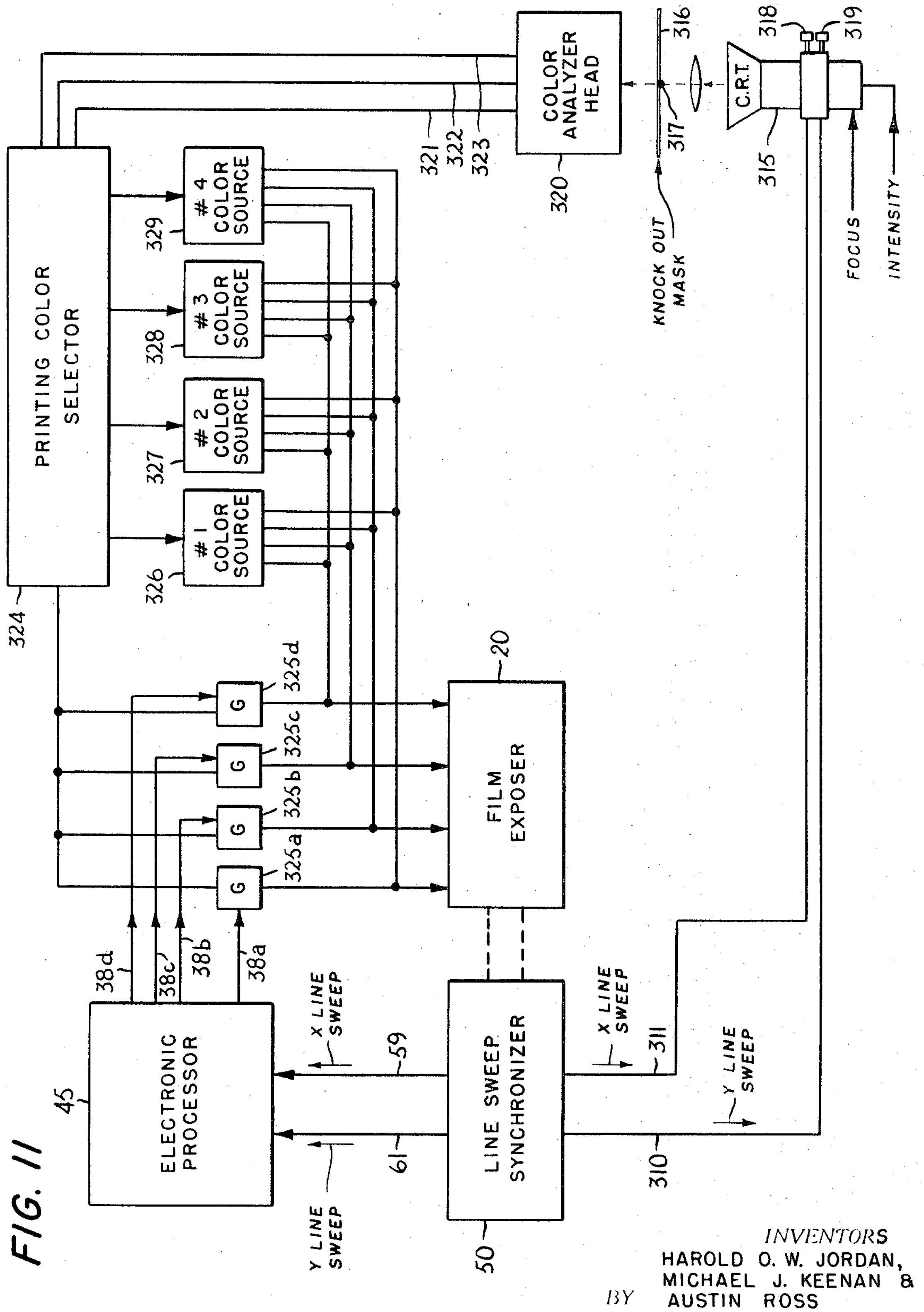

FIGS. *7a* and *7b* are diagrams illustrative of the defocusing action of the FIG. 6 system;

FIG. 8 is a block diagram showing a portion of a FIG. 1 system of a type wherein area scanning is effected by the use of noise signals;

FIG. *9a* and *9b* are diagrams illustrative of the area scanning action provided by the FIG. 8 system;

FIG. 10 is a block diagram of a FIG. 1 system of a type wherein area scanning is effected by the use of a two-gun cathode ray tube; and FIG. 11 is a block diagram of a FIG. 1 system as modified to include control of the reproduced matter by a knockout mask and scanning of that mask by an additional cathode ray tube.

Referring now to FIG. 1, the reference 20 designates a film exposer unit comprised of a drum 21 on a shaft 22 journaled in bearings 23, 24 and rotated at constant speed by a motor 25 on a base 26 which also supports the bearings 23, 24. Mounted on the same base 26 and opposite drum 21 is a carriage 27 slidable on ways 28 parallel to the axis of drum 21. Carriage 27 is displaced leftward one incremental step for each full revolution of the drum. Such advancement of the carriage is effected by a drive mechanism 29 which may be, say, of the type disclosed in U.S. Pat. No. 2,778,232 issued Jan. 22, 1957 in the name of R.P. Mork.

Carriage 27 acts as a support for four axially spaced glow lamps 35*a*—35*d* referred to herein as, respectively, the "yellow," "magenta" and "cyan" and "black" glow lamps. The four glow lamps provide respective outputs in the form of four exposing light beams 36*a*—36*d* of which each is focused to form a bright exposing spot on a corresponding one of four sensitized sheets of photographic film 36*a*—37*d* mounted in axially spaced relation on drum 21 to rotate therewith. Each leftward axial advancement by a step of carriage 27 is timed to occur when the rotation of drum 21 brings it to an angular position at which the exposing beams impinge on the drum surface rather than on films 37a—37d. Accordingly, the combination of the rotary motion of drum 21 and the axial stepwise motion of carriage 27 causes each of the mentioned spots to scan in a raster pattern over the film on which that spot falls.

Simultaneously with such scanning of the films, the four exposing light beams are respectively modulated in intensity by four signals fed via leads 38a—38d to the glow lamps 35a—35d. The manner of deriving those four signals will be later described in detail. For the time being, it suffices to say that the signals on leads 38a—38d are respectively representative of the yellow, magenta, cyan, and black color components of scanned tone values of an original color transparency 40, and, further, that such signals cause the beams from the glow lamps to expose yellow, magenta, cyan and black color separation images of the original visual image on, respectively, the films 37a, 37b, 37c, and 37d. The resulting color separations (which may be either positives or negatives) are employed in a well known manner to ultimately provide a color reproduction of original copy 40 in, say, the form of either a halftone color print of that original or a positive color transparency which is a replica of the original.

Considering now the matter of the scanning of original 40, the rotary motion of drum 21 and the axial motion of carriage 27 are transmitted to a synchronizing unit 50 via respective mechanical couplings represented in FIG. 1 by the dash lines 51 and 52. Within unit 50, the rotary motion is transmitted to the wiper 53 of a circular potentiometer 54 having a resistive winding 55, and the axial motion is transmitted to the wiper 56 of a linear potentiometer 57 having a resistive winding 58. Each of windings 55 and 58 is connected at one end to ground and at the other end to a source of constant DC voltage.

Circular potentiometer 55 operates as follows. During each full revolution of drum 21, wiper 53 sweeps once at constant speed over winding 55 to generate at the wiper a sawtooth signal which is periodically repeated. That signal has a waveform divided into a leading portion at a lagging portion of shorter duration than the leading portion. During all of the leading portion, the wave form rises linearly from zero so as to provide a straight rising edge. During the lagging or "flyback" portion, the waveform first drops almost instantaneously to zero and then remains at zero until the start of a new waveform. Wiper 53 is angularly disposed relative to films 37a—37 on drum 21 such that the start of the rise from zero of each sawtooth occurs at or before the time the beams 36a—36d just start to scan over films 37a—37d. The winding 55 is of an angular length such that the start of the lagging or "-flyback" portion of each sawtooth occurs at or after the time the beams 36a—36d are just finishing a line scanning of the mentioned film.

In the case of the linear potentiometer 57, wiper 56 is positioned relative to carriage 27 to be at the grounded end of winding 58 when the beams 36a—36d are positioned at or to the right of (FIG. 1) the right-hand edges of the films 37a—37d. As carriage 27 is moved leftward step by step by mechanism 29, wiper 56 also moves leftward step by step over winding 58 to cause the generation at the wiper of a sawtooth signal of which the leading edge rises from zero voltage and is of staircase shape. At or after the time carriage 27 has moved leftward enough for beams 36a—36d to move to the leftward edge of films 37a—37d, carriage 27 is reset to its rightward starting position and such resetting produces a corresponding rightward movement of wiper 56 and the generation of the "-flyback" portion of the sawtooth signal generated at that wiper.

The signals at wipers 56 and 53 are supplied via leads 59—60 (for wiper 53) and the leads 61, 62 (for wiper 53) to respectively, the X deflection terminal 63 and the Y deflection terminal 64 of a cathode ray tube 65 equipped with conventional X and Y deflection gain control knobs 68 and 69. Tube 65 is within a section 45 of the FIG. 1 system referred to herein as the electronic processor bit containing optical as well as electronic components. Terminals 63 and 64 of tube 65 are connected to conventional first and second means within the tube for deflecting the electron beam thereof in X and Y directions which are orthogonal with each other. The electron beam generates in a conventional manner a spot 67 of intense suitably polychromatic light at the point of impingement of the beam on the phosphor screen of the tube. A phosphor with T.E.D.E.C. Type P-24 spectral characteristics is suitable. Moreover, tube 65 includes conventional internal means for blanking out spot 67 during an interval in which that spot is undergoing "flyback" motion, after being fully deflected by the signal from wiper 53 or the signal from wiper 56.

From the foregoing description it is evident that, when the discussed straight-edged and staircase-edged sawtooth signals are applied to respectively, the terminal 63 and the terminal 64, spot 67 will be swept across the tube screen in the Y direction in a succession of lines which are successively displaced in the X direction to form a raster scanning pattern generated by the spot. Moreover, it is evident that the generation of such pattern is synchronized with the generation of the raster patterns by which the exposing light beams 36a—36d scan over the films 37a—37d. The X and Y dimensions of the tube spot pattern correspond to and are proportional to the dimensions of the film scanning patterns produced by, respectively, the rotatory motion of drum 21 and the axial motion of carriage 27. It follows that the tube spot raster pattern is the same in shape as the film scanning raster patterns. Keeping such constant shape relationship, the size of the tube spot pattern relative to the size of the film scanning patterns can be readily varied by readjusting the settings of the X and Y deflection control 68 and 69. In other words, the described system provides for a selectively variable enlargement ratio between the size of the scanning pattern generated by tube spot 67 and the size of the patterns by which films 37a—37d are scanned by the exposing light beams 36a—36d.

The light from spot 67 passes in a beam 70 through an optical system 71 (represented schematically in FIG. 1 by a lens) which forms that light into a white spot 75 scanning over the original color transparency 40 in a raster pattern similar in shape and proportional in size to that generated on the screen of tube 65 by the flying spot 67. In between tube 65 and transparency 40, a small fraction of the light from spot 67 is intercepted by a beam monitoring device 76 (later described in detail) of which the output appears on lead 77.

The white light of spot 75 is transmitted through color transparency 40 to thereby be modulated in color content and intensity in accordance with the tone values of the transparency which are instantaneously detected in the course of scanning the transparency by the spot 75. After emerging from transparency 40, the modulated light passes in a beam 76 to a color analyzer head 80. Head 80 derives from incoming beam 76 three different signals appearing at the head outputs 81a, 81b and 81c, respectively, and having respective instantaneous amplitude values corresponding to, respectively, the blue, green and red color components of the color tone values of transparency 40 which are instantaneously scanned by spot 75. Although the signals at outputs 81a, 81b and 81c thus correspond directly to blue, green and red color components of the original, for reasons well known to the art such signals are usually referred to as, respectively, the yellow, magenta and cyan signals. Those signals are applied to leads 82a, 82b and 82c forming a common channel means 83 in the described system.

From channel means 83, such signals pass to a signal separator unit 85 (later described in detail) and through that unit to yellow, magenta and cyan channels 86a, 86b and 86c together forming a spot signal channel means 87. Upon emerging from channel means 87, the spot signals are processed in a computer unit 90 having the function, among others, of deriving a "black" color component signal of which the instantaneous amplitude values are representative of the black-and-white or achromatic content of the tone values of transparency 40 instantaneously scannned by the spot 75. The processed yellow, magenta and cyan signals (which are the chromatic color component signals) and the black signal (which is the achromatic color component signal) are then supplied as the electric output of computer unit 90 to, respectively, the leads 38*a*—38*d*. The signals on those leads serve, as already described, to control glow lamps 35*a*—35*d* so as to cause exposure on the films 37*a*—37*d* of yellow, magenta, cyan and black separation images of the originally scanned visual color image provided by the color transparency 40.

In the FIG. 1 system as so far described (a) the scanning of the original 40 in a raster pattern generated by the spot of a cathode ray tube, and (b) the synchronizing of the generation of that pattern with the generation of the patterns by which films 37*a*—37*d* on drum 21 are scanned are features which, of themselves, are not part of the present invention. That is so because, as stated, a proposal for a scanner system with such features has already been made by others than ourselves. Moreover, it is to be understood that the system as so far described is exemplary only and can be widely modified within the scope of the present invention. FOr example, the scanning of films 37*a*—37*d* can be effected by having drum 21 axially displaced stepwise or continuously past glow lamps 35*a*—35*d* which are stationary instead of, as shown, being axially displaced relative to the shown axially stationary drum. Further, devices other than potentiometers 54 and 57 can be employed to synchronize the raster pattern generated by tube 65 with the patterns of scanning of the color separation films 37*a*—37*d*. Still further, the pattern by which original 40 is scanned need not be generated in a wholly electronic manner, i.e., solely by deflection of the electron beam of the cathode ray tube. Alternatively, one of the two dimensions of such scanning pattern may be developed by mechanical movement of original 40 relative to the cathode ray tube 65. Moreover, it is in accordance with the present invention to produce both dimensions of the described main scanning pattern by mechanical movements of the original 40 relative to the cathode ray tube 65.

Coming now to a more detailed consideration of the improvement aspects of the FIG. 1 system, the operation of cathode ray tube 65 is under the control of unit 100 performing the following functions:

First, unit 100 supplies via lead 101 to the tube terminal 102 a signal which controls the intensity of the tube beam to periodically increase its brightness and blank it and regulate its brightness, all as later described.

Second, the tube control unit 100 supplies through lead 103 to the tube terminal 104 a variable voltage for controlling the degree of focusing of the tube beam.

Third, and most important, in preferred embodiments of the invention, the control unit 100 supplements the primary sawtooth deflection signals applied to the X and Y deflection terminals 63, 64 from unit 50 by auxiliary deflection signals fed to those terminals from unit 100 via leads 105, 106. As will now be described, those auxiliary signals produce area scanning of the original 40 by the cathode ray tube 65.

To outline generally the manner in which such area scanning is effected, over most of the time devoted to the scanning in a raster pattern of original 40 by spot 75, the spot moves over the original in a path determined entirely by the primary deflection signals fed to terminals 63, 64 from the synchronizing unit 50. Such scanning of the original by spot 75 is referred to herein as main path scanning. At intermittent intervals, however, the control unit 100 applies to terminals 63, 64 the mentioned auxiliary deflection signals so as to superpose such signals on the primary deflection signals. Those auxiliary signals cause an auxiliary movement of spot 75 to be superposed on the deflection movement of the spot in its main scanning path. The two auxiliary deflection signals are correlated in waveform to cause spot 75 in its auxiliary movement to scan original 40 in each of such intervals in an area centered on the main scanning path and moving therealong at the speed of travel of spot 75 in its main path. Preferably, such area is at least 20 times greater in diameter than spot 75 and, in practice, very good results are obtainable when the area is 100 times greater in diameter than said spot.

During any one of such intervals, spot 75 scans only a portion of the mentioned area. Unit 100, however, further operates to change the respective waveforms of the auxiliary deflection signals in a progressive and cyclical manner serving to produce a progressive displacement of the portions of the area scanned by spot 75 and, thereby, a sweeping of spot 75 through the entire area in a time period scanning a succession of such area scan intervals. That is, within such time period, spot 75 effects a sample scanning of each of a substantial number of area sectors which together constitute the entire mentioned area. On the other hand, in so sweeping through the whole area, spot 75 does not traverse every portion of the whole expanse of such area but, instead, traverses only sample portions which are large enough in number and appropriately located to yield a reliable indication of the average tone value of original 40 within the whole expanse of the discussed area. Also, while the repetition frequency of the area scan intervals may be a harmonic of the repetition frequency of the cyclical change in the waveforms of the auxiliary deflection signals, it is not necessary that there be such a harmonic relationship.

From the foregoing, it is evident that the scanning of original 40 by spot 75 alternates between relatively short time intervals in each of which an area scanning is superposed on the main path movement of the spot and relatively long time intervals devoted solely to main path scanning. The intensity variations of the beam 76 which correspond to, respectively, area scanning and main path scanning, are thus in time shared relation. Color analyzer head 80, however, does not discriminate between the area scanning and main path scanning variations of the beam. Hence, at the outputs 81*a*, 81*b* and 81*c* of the head and in common channel means 83, the signal variations derived from the main path scanning and the signal variations derived from the area scanning will be mixed together although being in time shared relation.

Such time shared relation is utilized by unit 85 to separate the signal variations in channel means 83 into spot signals derived from main path scanning and area signals derived from area scanning. More specifically, during each of the mentioned intervals in which control unit 100 supplies auxiliary deflection signals to cathode ray tube 65, that unit also supplies, via lead 110, to separator unit 85 a gating control signal. Unit 85 is an electronic switching unit normally operable to transmit signals in channel means 83 to the spot signal channel means 87. In each such interval, however, unit 85 responds to the control signal to switch the yellow, magenta and cyan signals in channel means 83 to, respectively, the yellow, magenta and cyan channels 115*a*, 115*b* and 115*c* of an area signal channel means 116. Because the signals in channel means 83 which are produced during such intervals are area signals derived from the area scanning of transparency 40 by spot 75, the overall effect of the switching action of unit 85 is to segregate the spot and area signals and to pass one and the other exclusively to, respectively, the spot signal channel means 87 and the area signal channel means 116.

The color component area signals in channels 115*a*—115*c* are subjected to processing therein and are then fed to an area signal combiner 120 within which such signals are combined in selected proportion to form a composite area signal. The latter signal is supplied via lead 122 to computer 90 as an input thereto in addition to the yellow, magenta and cyan spot or image signals from channel 87. Within computer 90, the input area signal modifies each of the yellow, magenta and cyan image signals to increase in the color reproduction ultimately derived from films 37*a*—37*d* the contrast between reproduced local tone details and reproduced contrasting tonal surroundings of such details as compared to what that contrast would be in the absence of the area signal modification. The specifics of how the area signals modify the image signals and the results thereby obtained in the color reproduction are fully disclosed in the aforementioned U.S. Pat. No. 3,194,883 to Ross.

Figure 2:
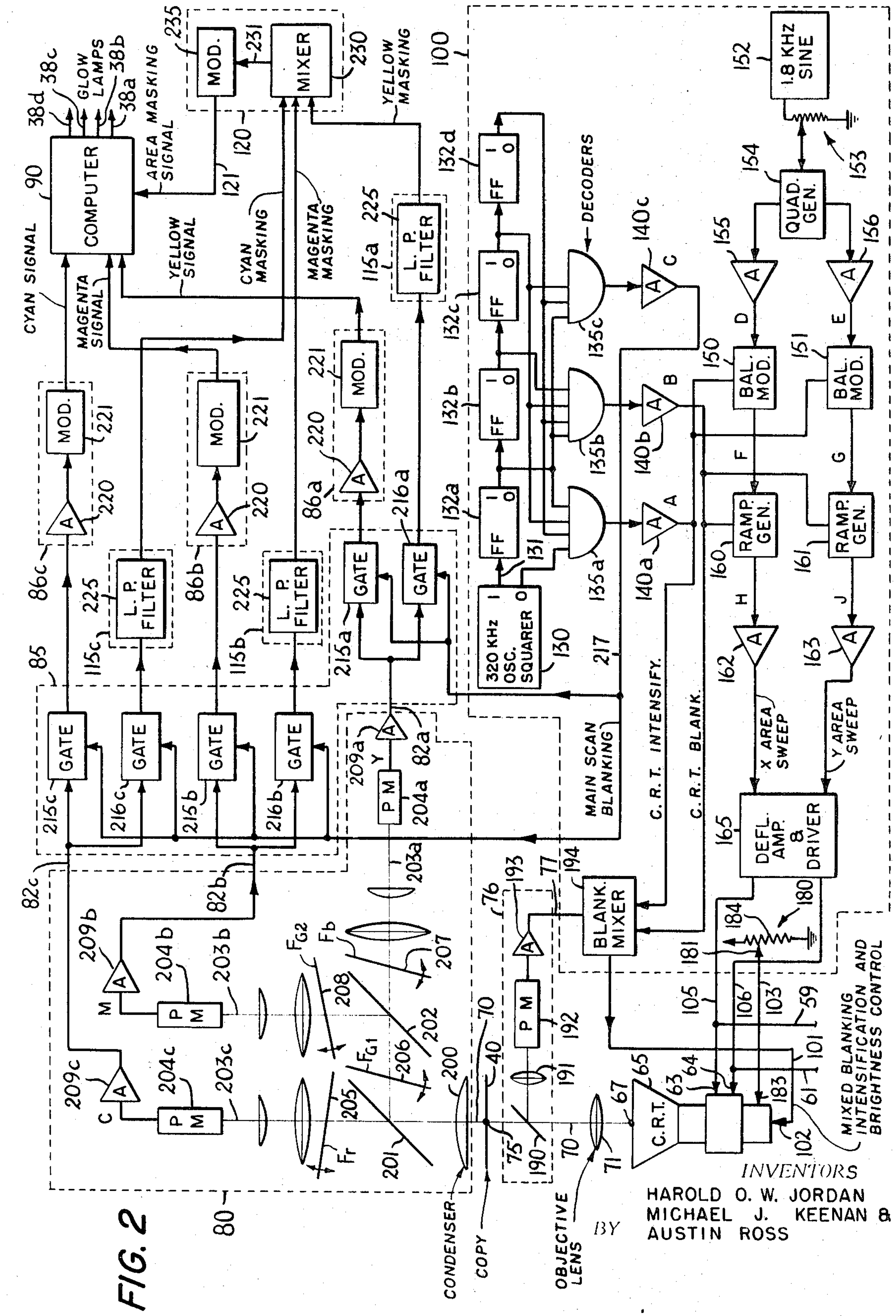
FIG. 2 is a block diagram showing details of a FIG. 1 system effecting area scanning by radial scans.

Reference is now made to FIG. 2 for a more specific showing of certain of the components of the FIG. 1 system in the instance where unit 100 of that system is of a sort to produce radial scannings of the mentioned area. In the unit 100 of FIG. 2, an oscillator and squarer circuit 130 supplied on lead 131 a continuous train of square waves having a frequency of 320 kHz. and a period for each wave of 3.125 microseconds. Those square waves are applied to a binary counter comprised of four flip-flop stages **132*a*—132*d* and adapted to clear and reset itself and start a new counting cycle each time after 16 input square waves have been received by the counter. Since each of those waves has a period of 3.125 microseconds, the duration of a counting period of the scale of 16** counter is 50 microseconds.

The oscillator-squarer 130 and the stages **132*a*—132*d* of the binary counter are connected to a diode decoding matrix provided by three decoders 135*a*—135*c*. During each 50 microsecond counter period, the decoders 135*a*—135*c* are adapted to provide separate outputs represented in FIG. 3 by waveforms A, B and C, respectively. As shown by those waveforms, the output of element 135*a* is a single 3.125 microsecond square wave pulse, the output of element 135*b* is a like pulse following immediately after pulse A, and the output of element 135*c*** is a single 6.25 microsecond square wave pulse having a duration which is coextensive with the sum of the durations of pulses A and B.

Pulse A is fed through amplifier **140*a* to each of two balance modulators 150 and 151** each provided with an additional input in a manner as follows.

Figure 3:
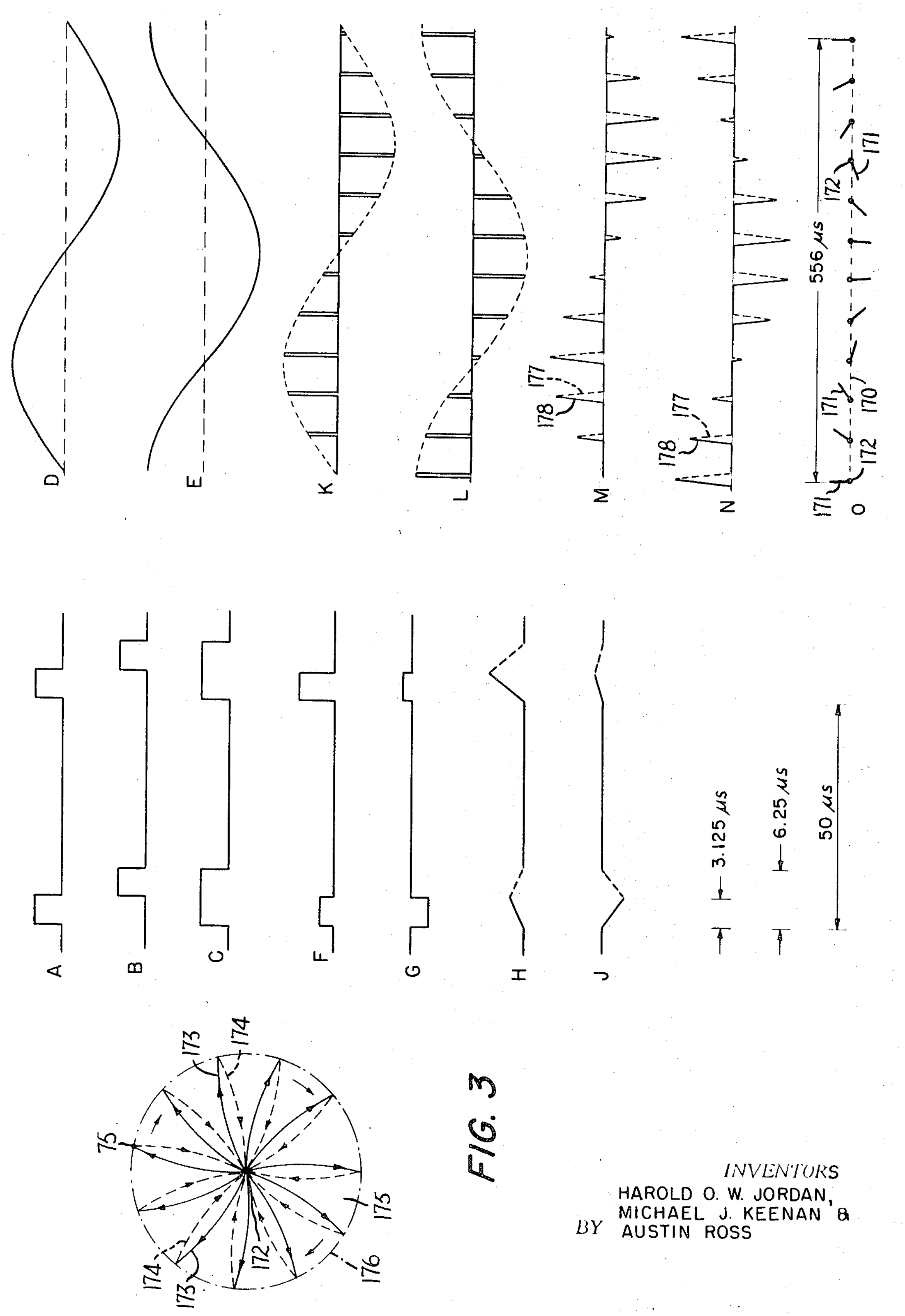
FIG. 3 shows wave forms characteristic of the operation of the FIG. 2 system.

An oscillator 152 supplies through voltage adjusting potentiometer 153 a 1.8 kHz. sinusoidal signal to a quadrature generator 154. Generator 154 operates in a well known manner to derive from the sine wave input a first sine wave output (FIG. 3, wave form D) supplied through amplifier 155 to modulator 150 and a second sine wave output (FIG. 3, waveform E) supplied through amplifier 156 to modulator 151. Those two sine wave outputs have the same frequency (1.8 kHz.) but are in quadrature phase relation with each other (FIG. 3, waveforms D and E).

The pulse A fed to modulator 150 is modulated in amplitude in accordance with the instantaneous amplitude at the time of the sine wave input to the modulator. In like manner, the pulse A fed to modulator 151 is modulated in amplitude in accordance with the instantaneous amplitude at the time of the sine wave input to the latter modulator. As a result, modulator 150 supplies an output in the form of a succession of amplitude-modulated square wave pulses characterized by a 50 microsecond repetition period and a sinusoidal modulation envelope, and modulator 151 provides an output similar to that of modulator 150 except that the modulation envelope of the pulses from element 151 is in quadrature phase relation with the modulation envelope of the pulses from element 150. The separate outputs of modulators 150, 151 are shown for a short interval by FIG. 3, waveforms F and G and, for a longer interval by FIG. 3, waveforms K and L.

In connection with the foregoing, it should be noted that the signals from modulators 150 and 151 are not simple "double side band suppressed carrier" outputs of balanced modulators. Instead, those signals have in them a component which corresponds to the modulating sine waves, and which causes the modulation envelope of each train of output pulses to ride above and below zero in the same manner as does the sine wave modulating signal.

The separate outputs of modulator 150 and modulator 151 are supplied as separate inputs to, respectively, a ramp generator 160 and a ramp generator 161. Each of generators 160, 161 is a conventional sawtooth generating circuit (e.g. an RC integrating circuit) which responds to each input pulse from the corresponding modulator to develop a sawtooth signal having a duration coextensive with that of the input pulse. The waveform of each such sawtooth starts at zero and changes linearly in magnitude at a rate proportional to the magnitude of the input pulse, the direction of change being of a polarity (positive or negative) the same as that of the input pulse. The generation of the described leading straight edge of each such sawtooth wave is terminated by the receipt by generators 160, 161 of a pulse B supplied through an amplifier **140*b* from the decoder 135*b*. That pulse B serves to produce a "flyback" portion of the sawtooth voltage wave form over the duration of pulse B, and, thereby, to ready the generators 160, 161 to develop new sawtooth waves. Accordingly, the separate outputs of ramp generators 160 and 161 are each in the form of a succession of amplitude-modulated sawtooth waves and are shown by, respectively, wave forms H and J (FIG. 3) for a short interval and by, respectively, waveforms M and N for a longer interval, It will be noted from the latter waveforms that the sawtooth wave trains from the generators 160, 161** have respective sinusoidal modulation envelopes which are in quadrature phase relation with each other.

The two discussed sawtooth outputs are amplified in individual amplifiers 162, 163 and in a deflection amplifier and driver unit 165 and are then applied, as before described to, respectively, the X deflection terminal 63 and the Y deflection terminal 64 of the cathode ray tube 65.

Referring to waveforms M and N (FIG. 3), it will be evident that the application to terminal 63 and 64 of the such sawtooth outputs in superposition with the primary deflection signals from synchronizing unit 50 (FIG. 1) will cause spot 75 on original 40 to intermittently deflect from its main scanning path 170 (FIG. 3, diagram O) in a succession of radial scans 171 which start from the moving position 172 in path 170 where spot 75 would be in the absence of any auxiliary deflection, and which, moreover, progressively rotate around position 172 in a manner similar to the PPI scan well known in radar. That is, if position 172 is viewed as if it were a stationary point (FIG. 3, diagram P), then spot 75 departs outwards from such point in a succession of time-separated radial excursions 173 which are progressively displaced clockwise around point 172. After each of those excursions, spot 75 returns to point 72 by "flyback" path 174 indicated by dash lines. The "-flyback" paths 174 do not coincide with the radially outward scan lines 173 of spot 75 for the reason that point 172 is not, in fact, stationary but is moving over the color transparency 40.

The succession of radial deflections of spot 75 away from and around point 172 produces a radial scanning by spot 75 of color transparency 40 in a moving area 175 having a circular circumference 176 defined by the extreme outward points reached by spot 75 in the course of its radially outward deflections. The diameter of that area may desirably be 100 times the diameter of spot 75 itself for which a typical diameter value is 1 mil. Each radial scan and subsequent retrace of spot 75 occupies 6.25 microseconds or one-eighth of the 50 microsecond repetition period of the scans, the remaining 43.75 microseconds being devoted to main path scanning. When spot 75 is moving in path 170 over original 40 at a typical scanning speed of 20 inches per second, each radial scan and subsequent retrace of the spot is accomplished within a time less than that required for the spot moving in path 170 to traverse one picture element, i.e., an element on image 40 which is of the shape and size of spot 75 itself and, thus, is a circular dot with a diameter of 1 mil. Because such a small fraction of the total scanning time is devoted to area scanning, and because each area scan and return is completed within the time needed for traversal by the spot of one picture element in path 170, the described intermittent area scanning produces a negligible loss in the information detected by the main path scanning. Accordingly, the area scanning action of spot 75 does not interfere appreciably with the faithful conversion of all of the tone values on original 40 into signal values of the color component spot signals in channels **86*a*—86*c***.

The values just given of (a) an area 175 having a diameter 100 times that of spot 75, (b) a time per area scan and return only one-eighth of the area scan repetition period, and (c) a time per area scan and return less than the spot diameter divided by the spot's main path scanning speed are only exemplary FIGS. Under any circumstances, however, it is preferred that area 175 be at least 20 times greater in diameter than spot 75, and that, with the present state of the art, the time required for each area scan and return be at most 25 percent of the area scan repetition period and at most equal to the spot diameter divided by the spot's main path scanning speed.

Inasmuch as the sine wave modulation envelopes of the sawtooth signal trains from unit 100 have a frequency of 1.8 kHz. and, therefore, a period of 556 microseconds, the rate of angular displacement around point 172 of the radial scanning by spot 75 will be 360° each 556 microsecond. Accordingly, that spot will sweep through area 175 in successive sweep cycles having a 556 microsecond repetition period for the full cycle. If the repetition periods of the area scans were to be equally divisible into that area sweep repetition period (and, if desired, such can be provided for in accordance with the invention), then the radial scans in successive area sweeps would be overlying and the spoke pattern formed by the scans would be stationary in rotation. With, however, the exemplary FIGS. used of 50 microseconds for the area scan repetition period and 556 microseconds for the area sweep repetition period for a full cycle, the smaller period is not equally divisible into the larger. The result is that the radial scan spoke pattern precesses around point 172 in the course of successive area sweeps. The reason why such precession takes place is that, assuming for a given first area sweep, a first radial scan produced at zero time at a reference zero angle position, then 10 more successive scans (or 11 scans in all) will be produced during that first sweep. The time interval between the first scan of the first 11 scans and the first scan of the second 11 scans is, however, 550 microseconds which is 6 microseconds short of the full sweep period of 556 microseconds. Therefore, the first area sweep is terminated short of its full sweep period, and the radial scans in the spoke pattern of the second sweep will lag in clockwise position behind the radial scans in the spoke pattern of the first sweep by an angular amount which initially is equivalent to a 6 microsecond time delay, but which progressively increases. Hence, the spoke pattern appears to precess or rotate backwards (i.e. counterclockwise) during that second sweep and ones successive thereto. Since the first scan of each area sweep lags behind the first scan of the preceding area sweep by 6 microseconds, the first scan of the ninth sweep will have precessed backward by an angle equivalent to 54 microseconds or, in other words, to an angular position separated by only 2 microseconds (in terms of angle) of the angular position occupied by the 11th scan of the first sweep. Hence, over nine area sweeps, the spoke pattern of the radial precesses enough to cover substantially the entire expanse of area 175. In the course of the time required for those nine area sweeps, the linear movement of spot 75 in main path 170 will have displaced that spot by a distance in path 170 somewhat less than nine times the diameter of one picture element.

As is evident from diagram P of FIG. 3, the portions of area 175 traversed by spot 75 in its radial scans are areal portions which add up in one area sweep to only a small fraction of the total expanse of area 175. Even so, since there are 11 of such radial scans per area sweep, and those scans are spaced equiangularly around point 172 (except for the slightly oversized spacing between the first and 11th scans), the tone values of original 40 detected by those 11 scans form a representative sample of all the tone values of original 40 within area 175. Accordingly, the tone values detected by such sample scanning of area 175 provide a reliable measure of the average tone value characterizing that whole area. Moreover, the accuracy of such measure of average tone value is increased by the precession over successive area sweeps of the spoke pattern formed by the radial scans. That is, if, in the first of a succession of area sweeps, any significant tone values of area 175 should happen to fall between the spokes of the scan pattern and thus be missed, the precessive rotation of the pattern will cause such previously missed tone values to be detected no later than the occurrence of the ninth area sweep in that succession, and, therefore, no later than the time required for spot 75 to move a distance of nine picture elements in path 170. Because that distance is short relative to the diameter of area 175 and because (as later described), the signals derived from successive area scans are integrated, a very close approximation to the average tone value of the whole area 175 is provided by the described composite area signal at the cost of a time delay which is insignificant in connection with the purpose for which that signal is employed, i.e., increase of local contrast in the ultimate reproduction.

In connection with the scanning of area 175, the sawtooth waves which produce that scanning each have a "flyback" portion 177 (FIG. 3, waveforms, M and N) of substantially the same duration as the leading edge portion 178 which produces the radially outward scans of spot 75. The shape of such sawtooth wave thus stands in contrast to that of more conventional sawtooth signals wherein the "flyback" interval is very short. The employment in the FIG. 2 system of sawtooth waves characterized by relatively long "flyback" intervals is advantageous because such long intervals reduce the high frequency components of the sawtooth signals and, thereby, facilitate the transmission without distortion of the signals to the locations within tube 65 at which those signals are effective to deflect the tube's electron beam. The advantage just described is particularly pronounced in the instance where the beam is deflected by magnetic coils which would present a high inductive reactance to high frequency components of the sawtooth signals.

When area 175 is radially scanned, as described, by spot 75, the average point-to-point illumination of the area by the spot over a sweep cycle is Gaussian in the sense that the average intensity of the area illumination decreases progressively from the center point 172 to the circumference 176 of the area. That radially outward decrease in illumination occurs because, while each radial scan path 173 in area 175 is of constant width and has constant illumination over its length, the angular sector of the area which is bisected by that path is of constantly increasing width from the center point 172 to the circumference 176. Hence, if at any radial distance from point 172, the light in each scan path 173 is considered to be distributed over the width at that distance of the corresponding angular sector of the area so as to arrive at an average intensity of illumination at that distance of the whole area 175 such average intensity of illumination will monotonically decrease in the radially outward direction. As described in more detail in the aforementioned Ross patent, such radially outward falling off of the intensity of illumination is advantageous because it inhibits an over-emphasis in the ultimate reproduction of original 40 of a tone density edge scanned in the original by moving spot 75 and the accompanying moving area 175.

Returning now to control unit 100, besides furnishing to tube 65 the auxiliary deflection signals which effect the area scannings, unit 100 performs other functions as follows:

First, the unit generates by potentiometer 180 a focusing voltage supplied from the potentiometer's wiper 181 and via lead 103 to the focusing control terminal 183 of tube 65. In the FIG. 2 system, that focusing voltage is operably maintained constant but can be adjusted between scanning cycles by selective setting of the position of wiper 181 on the potentiometer winding 184.

Second, because the radial scans 173 of spot 75 occur at high speed, it is desirable to brighten the spot during its area scan intervals. On the other hand, the light from spot 75 is preferably extinguished during the returns 174 of the position of the spot to center point 172. Also, the intensity of the spot is preferably maintained at constant average brightness over a scanning cycle of original 40.

To attain the objectives just mentioned, the intensity of beam 70 is monitored by device 76 within which a pellicle 190 diverts a sample of the light from the beam through a focusing lens 191 to a photo multiplier 192. The resulting electric signal from the voltage multiplier is amplified in amplifier 193 and then supplied via lead 77 as a brightness control signal to a conventional blanking-mixer circuit 194 in unit 100. That circuit receives as additional inputs the pulses A and B from amplifiers **140*a* and 140*b*. Within circuit 194, the signals supplied thereto are mixed to form an output fed via lead 101 to the beam intensity control terminal 102 of tube 65. The waveform of that output is shaped in a well known manner to control the intensity of the electron beam of tube 65 so as to produce (a) an increased brightness of spot 75 during its radial scan 173, (b) extinguishment of the light from the spot during the "flyback" movement 174 of the spot position, and (c) normal spot brightness in the intervening intervals during which spot 75 is scanning in its main path 170. Also, the amplitude of the output from circuit 194 is regulated by the brightness control signal from photomultiplier 192 to maintain constant over a scanning cycle of original 40 the average brightness of the scanning spot 75**.

Coming now to the color analyzer head 80, the optical system in that head is the invention of Harold O. W. Jordan rather than being a part of the present invention. Nonetheless, such system will be discussed briefly herein because of the particular suitability thereof for the practice of the present invention.

The input to such system is the beam 76 which is moving in a raster scanning pattern as well as being modulated in intensity by the tone values of original 40 detected in the course of the scanning of the original. Within head 80, beam 76 is first passed through a condenser lens 200 which collimates the beam to a divergence of 5° from normal, i.e., to a divergence 5° greater than what the beam would have if it were stationary. Next, beam 76 is divided by low absorption beam spliters 201 and 202 into three subbeams **203*a*, 203*b* and 203*c* impinging on, respectively, photomultipliers 204*a*, 204*b* and 204*c*. Dichroic filters 205—208 are disposed as shown in the optical system to convert the subbeams 203*a*, 203*b* and 203*c* into, respectively, blue, green and red beams which are incident on their corresponding photomultipliers. The wave length pass band of each of dichronic filters 205—208 is variable by adjustment of the angle of incidence on the filter of the beam passing therethrough, and each such filter is mounted to permit such adjustment. Hence, the described optical system permits selectively variable control over the range of wave length contained in each of the beams 203–203*c***.

The yellow, magenta and cyan signals respectively derived by photomultipliers **204*a*, 204*b* and c from the beams incident thereon are amplified in amplifiers 209*a*, 209*b* and 209*c*, respectively, and are then fed to the signal separator unit 85. Within that unit, the yellow, magenta and cyan signals are applied to the inputs of, respectively, the gates 215*a*, 215*b* and 215*c* and, also, to the inputs of, respectively, the gates 216*a*, 216*b* and 216*c*. Each of the gates in unit 85 receives a gating signal in the form of pulse C (FIG. 3, waveform C) supplied from decoder 135*c* and through amplifier 140*c* and lead 217 to the mentioned unit. Each pulse C spans the time occupied by a pulse A (within the duration of which a radial scan takes place) and the time occupied by the immediately following pulse B (within the duration of which the "flyback" by the preceding radial scan takes place). Moreover, each pulse C acts as an "off" gating signal for gates 215*a*–215*c* and as an "on" gating signal for the gates 216*a*–216*c*. Therefore, separator unit 85** has a switching action as follows.

While spot 75 is scanning in its main path 170 (FIG. 3, diagram 0), gates **215*a*–215*c* are conductive to pass the yellow, magenta and cyan signals from head 80 to the spot signal channels 86*a*–86*c*, and gates 216*a*–216*c* are nonconductive. When, however, a pulse C is applied to unit 85, for the duration of that pulse, the gates 215*a*—215*c* are rendered nonconductive and the gates 216*a*—216*c* are rendered conductive to pass the yellow, magenta and cyan signals from head 80 to the area signal channels 115*a*—115*c*. It follows that, since the duration of each pulse C is coincident with the times of occurrence of a radial scan and immediately following return of the spot 75 illuminating original 40, the unit 85 operates to separate the signals from head 80 into (a) spot signals derived from main path scanning of the original and fed exclusively to channels 86*a*—86*c*, and (b) area signals derived from area scanning of original 40 and fed exclusively to channels 115*a*—115*c***.

The spot signal channels **86*a*—86*c* are shown in FIG. 2 as each including an amplifier 220 and a modulator 221 by which the variable DC signal in the channel is converted into modulation on a high frequency carrier. Although not shown in FIG. 2, the separate channels for the color component spot signals continue on through computer 90** within which those signals are subjected to additional processing such as tone range compression, color masking, undercolor removal, and so on.

Each of the area signal channels **115*a*—115*c* is comprised of a low pass filter 225. The filters 225 have an integrating action on the originally intermittent color component area signals so as to render those signals continuous at the output of the filters. Also, the integrating effect is operable over successive scans of spot 75 so as to render each continuous area signal representative (in terms of its color component) of the average tone value detected in area 175** over a plurality of scans rather than over one scan.

From channels **115*a*—115*c*, the color component area signals are fed to combiner 120 comprised of a mixer 230 for adding those separate signals together to form a composite area signal on the output lead 231 for the mixer. Mixer 230 is a conventional circuit which may be comprised of, say, three potentiometers of which the winding of each has impressed thereacross the voltage of a respectively corresponding one of the three color component area signals, the wipers of all three potentiometers being commonly connected to the output 231**. With a mixer of such sort it is possible (by individual adjustment of the wipers on their respective windings) to vary at will the respective percentages of the three color component area signals in the composite area signal formed therefrom.

The composite area signal on lead 231 is a variable DC signal but is converted by modulator 235 into modulation on the same high frequency carrier as that used for the spot signals. After so being converted, the composite area signal is fed via lead 121 to computer 90 to act therein as an area masking signal in the manner described in the aforementioned Ross patent.

Figure 4:
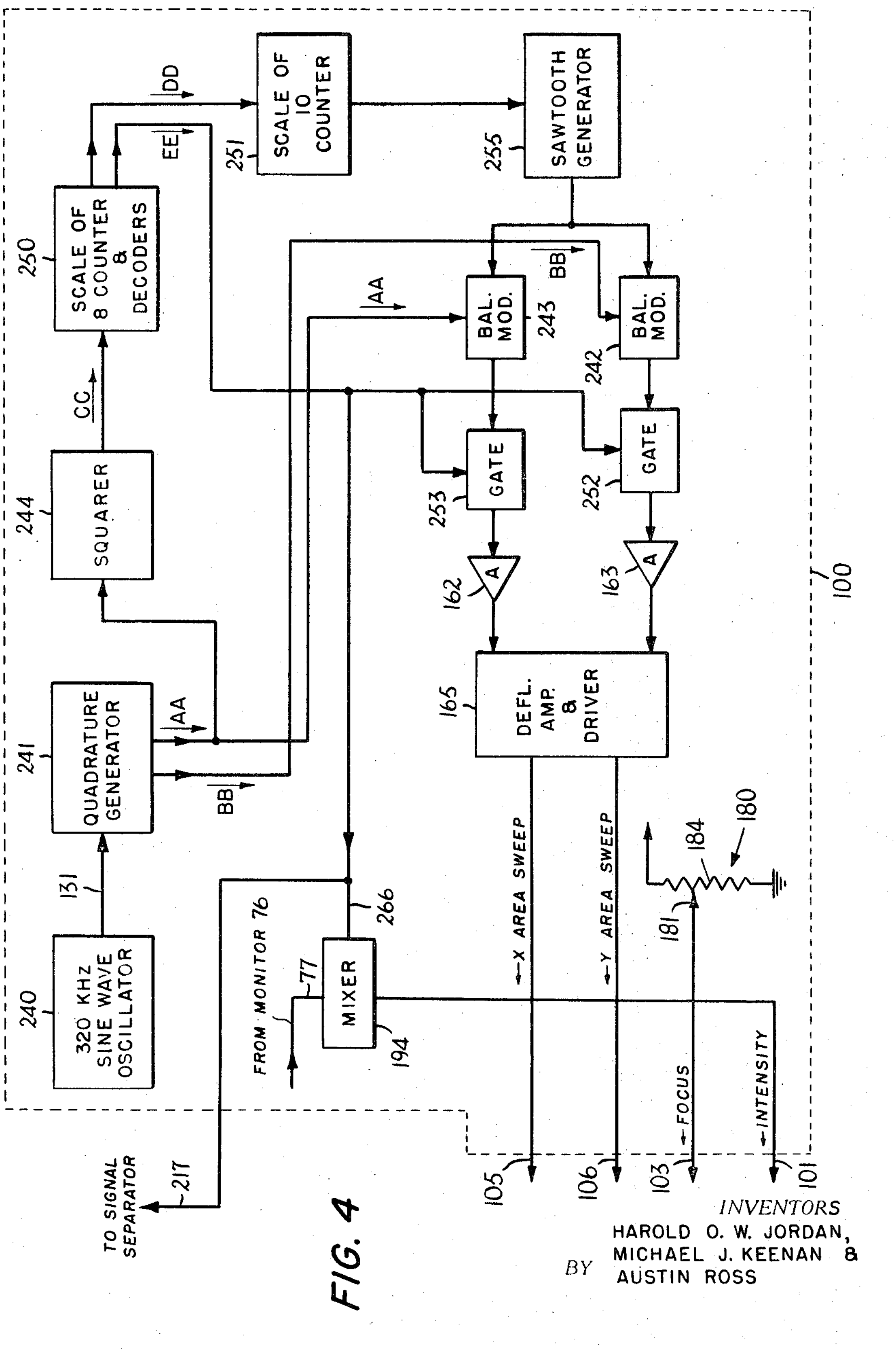
FIG. 4 is a block diagram showing details of a FIG. 1 system effecting area scanning by spiral scans.
Figure 5:
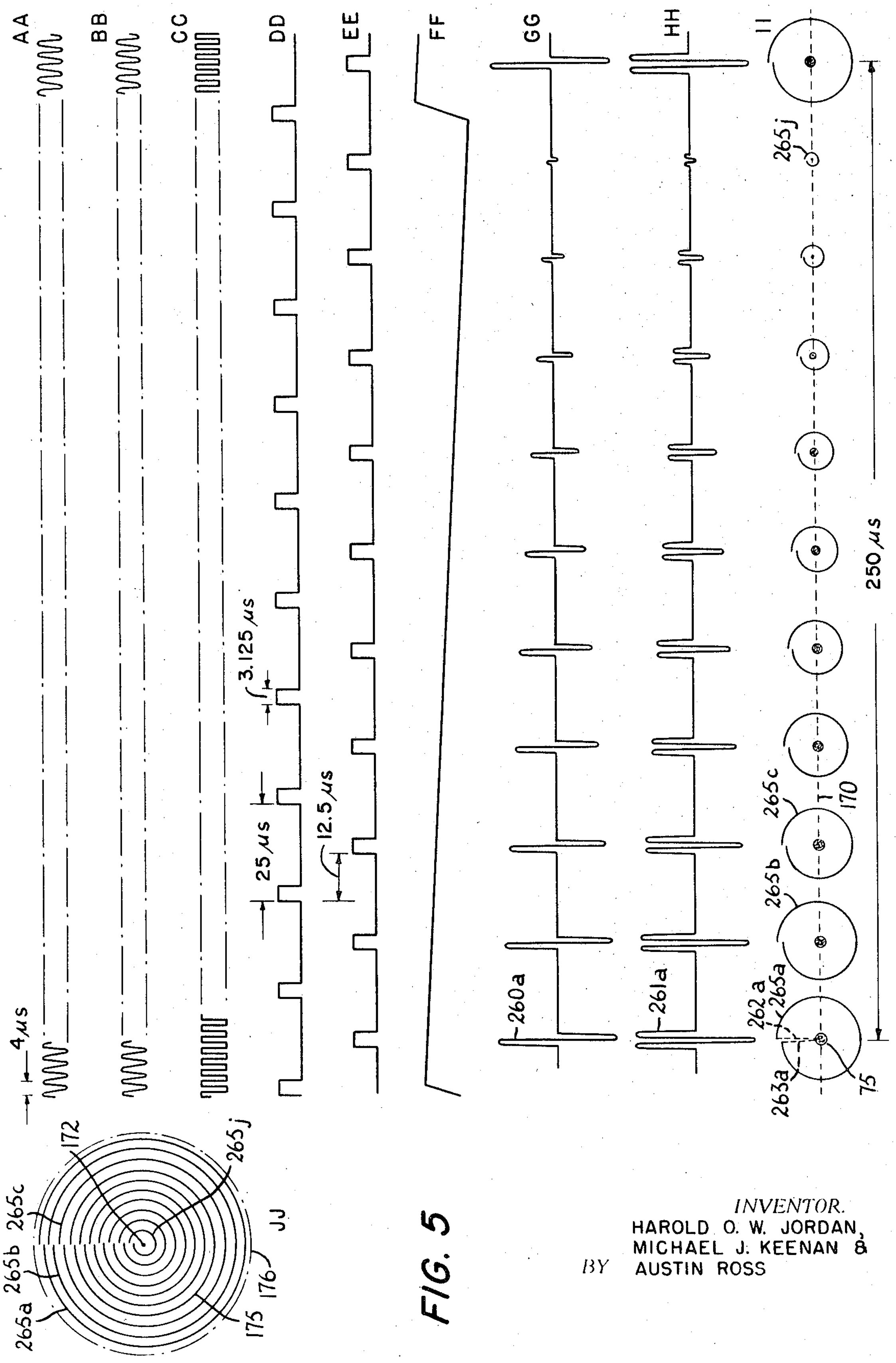
FIG. 5 shows diagrams of wave forms characteristic of the operation of the FIG. 4 system.

Moving on to a consideration of other modes of area scanning, FIG. 4 shows a control unit 100 usable in the FIG. 1 system and adapted to provide a spiral type of area scanning by that system. FIG. 5 is illustrative of aspects of the operation of the FIG. 4 system.

In FIG. 4, a 320 kHz. oscillator 240 drives a quadrature generator 241 providing outputs in the form of a first 320 kHz. sine wave (FIG. 5, waveform AA) and a second 320 kHz. sine wave (FIG. 5, waveform BB) in quadrature phase relation with the first wave. Wave BB is fed to balanced modulator 242. Wave AA is fed both to another balanced modulator 243 and to a squaring circuit 244. Circuit 244 operates on wave AA to generate therefrom a 320 kHz. square wave (FIG. 5, waveform CC) which is coherent with and in phase with wave AA.

The square wave output from circuit 244 is fed to a circuit 250 comprised of a scale of 8 binary counter and of a decoding diode matrix yielding a first pulse train (FIG. 5, waveform DD) fed to a scale of 10 binary counter 251 and a second pulse train (FIG. 5, waveform EE) fed to circuits 252 and 253 serving as normally nonconductive gates for the outputs of, respectively, modulator 242 and modulator 243. In each of those pulse trains, the width of each pulse is 3.125 microseconds, and the pulse repetition period is 25 microseconds. The pulses in each train are displaced in time by 12.5 microseconds from the pulses in the other train.

The scale of 10 counter 251 responds to pulse train DD to, in effect, remove 9 out of every 10 pulses from that train. Thus, the output of counter 251 is a train of pulses coincident in time with every tenth pulse of train DD and having a pulse repetition period of 250 microseconds. The pulses in that output train are applied to a sawtooth wave generator 255 to intermittently reset such generator to develop a new sawtooth. Hence, such generator (which may be an operational amplifier integrating a constant input) produces an output in the form of a succession of sawtooth waves of which each has (FIG. 5, waveform FF) a relatively long and straight leading edge, a relatively short flyback portion, and a period of 250 microseconds.

The sawtooth waves from generator 255 are applied to modulators 242 and 243 as an input to each thereof in addition to the inputs to such modulators 242, 243 of, respectively, the 320 kHz. sine wave AA and 320 kHz. sine wave BB in quadrature phase relation with AA. Within modulators 242 and 243, the received sawtooth waves modulate the amplitude of the high frequency sine waves respectively received by those modulators. As a result, the separate outputs of the two modulators are each an amplitude modulated 320 kHz. sinusoidal signal of which the modulation envelope is in the form of a succession of sawtooths each having a 250 microsecond period. While the modulation envelopes of such two outputs are in phase, the sine wave components of such outputs are in quadrature.

The described outputs of modulators 242 and 243 are fed to, respectively, the gates 252 and 253 which, as stated, are normally nonconductive. Receipt, however, by circuits 252 and 253 of each pulse in pulse train EE causes that circuit to be gated "on" to pass one sine wave cycle of the output of the associated modulator. Hence, gate 252 provides a signal in the form of a train of amplitude modulated one cycle sine wave bursts having a sawtooth modulation envelope (FIG. 5, waveform GG). Similarly, the output of gate 253 is a train of amplitude modulated one cycle sine wave bursts (FIG. 5, waveform HH) which are coincident in time with the bursts of train GG but are displaced 90° in respect to the points of starting and stopping of the generated single sine wave cycle. It will be noted that, since the successive tenth pulses of train DD which initiate the modulating sawtooths are out of phase with the EE pulses which are time coincident with the sine wave bursts from gates 252 and 253, the flyback portion of each such sawtooth will always occur between and in out of phase relation with two consecutive ones of such sine wave bursts. Hence, the signal trains from gates 252 and 253 are free of the high frequency components which they would have if ones of the sine wave bursts in those trains were to occur during the transient flyback intervals of the modulating sawtooth waves.

The trains of sine wave bursts from gate 252 and 253 are amplified by the previously described amplifiers 162, 163, 165 and are then fed via leads 105 and 106 to, respectively, the X deflection terminal 63 and the Y deflection terminal 64 of the cathode ray tube 65 (FIG. 1). When applied to those terminals, the sine wave bursts produce a sample scanning of original 40 in area 175 by spot 75 in a manner as follows:

Referring to diagrams II and JJ of FIG. 5, the application of the first burst **260*a* and 261*a* of trains GG and HH causes the spot 75 to depart almost instantaneously from main scanning path 170 in a radially outward deflection path 262*a*. Next, spot 75 scans original 40 in a ring sector 265*a* centered on the moving center 172 of the moving area 175. At the end of bursts 260*a*, 261*a*, the spot 75 returns almost instantaneously to main path 170 by way of a radial flyback path 263*a* substantially coincident in angular position with, but shorter than, the radially outward deflection path 262*a*. Because bursts 260*a*, 261*a* are modulated in amplitude by the shown sawtooth FF, ring sector 265*a* is a sector of a spiral rather than of a circle. Moreover, because bursts 260*a*, 261*a* occur when the instantaneous amplitude of sawtooth FF is greater than for any other bursts occurring during that sawtooth, ring sector 265*a* is formed at the maximum radial displacement outward from area center 172 so as to be adjacent the circumference 176 of scanned area 175**.

Successive ring sector scans **265*b*, 265*c* and so on are produced by successive sine wave bursts occurring during the period of the shown modulating sawtooth FF. Because the instantaneous amplitude of FF is progressively decreasing between successive ones of those bursts, the successively generated ring sector scans are progressively smaller in average radius so as each to be progressively displaced radially inward of the preceding scan. The development of such progressively smaller scans continues until the tenth or smallest scan is reached. Then, a pulse derived from train DD triggers the generation of a new modulating sawtooth to start a new area scanning cycle in which, as before, a succession of progressively smaller spiral ring sector scans are generated within the area 175**.

During the ring sector scannings of spot 75, the spot is increased in brightness by the feeding of the pulses EE via lead 266 to mixer circuit 194 to thereby intensify the electron beam of 265 for the period of each scan. The same pulses EE are fed via lead 217 to the separating unit 85 (FIGS. 1 and 2) to cause that unit to transmit to different channel means (in the manner already described) the spot signals derived from main path scanning of original 40 and the area signals derived from area scanning of that original. The FIG. 4 system, however, does not incorporate the feature of the FIG. 2 system of effecting a blanking of the electron beam after each area scan and of supplying to separator unit 85 a gating signal over an interval which spans both the time that the electron beam is intensified and the time that the electron beam is blanked.

The ring sector area scanning provided by the FIG. 4 system is similar to the radial area scanning provided by the FIG. 2 system by being characterized by the advantages that (a) the scanned area is at least 20 times greater in diameter than spot 75 and, preferably, is one hundred or more times greater in diameter than such spot, (b) the time devoted to area scanning is less than 20 percent of the total scanning time, (c) each area scan and return is completed on or before the time the position of the spot 75 in the main scan path 170 has moved a distance of one picture element, and (d) the average point to point illumination of area 175 progressively decreases in the radially outward direction. (Feature (d) is realized for the reason that, in the FIG. 4 system, the linear scanning speed of spot 75 progressively decreases with the radius of the progressively smaller ring sectors through which that spot scans). Moreover, the ring sector area scanning method has the advantage that the circuitry needed to produce the area scans is relatively simple. A disadvantage, however, of the ring sector scanning method is that the auxiliary deflection signals GG and HH must contain relatively high frequency components in order to almost instantaneously deflect spot 75 in the outward excursion and flyback paths **262*a* and 263*a*** and those high frequency components may tend to become attenuated before they are effectual in producing deflection of the electron beam of the cathode ray tube. For that reason, the radial scan system is preferred.

Turning now to further embodiments of this invention, in the FIG. 6 system, the output of the oscillator and squarer 130 (FIG. 2) is fed directly to the scale of 8 counter 250 (FIG. 4) to produce the pulse train EE (FIG. 5). The pulses in that train are, as before, fed via lead 217 to separating unit 85 (FIG. 2) and to mixer 194. In addition, the pulses of the train EE are fed to focusing control terminal 183 of tube 65 to produce a defocusing of the electron beam of that tube for the period of each pulse. While the beam is defocused, it is simultaneously increased in intensity by the signal fed from mixer 194 to the intensity control terminal 102 of the tube.

The concurrent defocusing and intensifying of the beam produces a blooming of spot 75 over the whole of area 175 during intermittent intervals alternating with the intervals of straight line movement of focused spot 75 along the main scanning path 170 (FIG. **7*a*). Thus, all of area 175 is scanned at one time by the defocused spot. The signals derived by head 80 (FIGS. 1 and 2) from spot 75 during the focused main path scanning thereof and the defocused area scannings thereof are separated as before by separator unit 85 (FIG. 2) in response to the gating signal supplied to the unit by lead 217** (FIG. 6).

Figures 7A, 7B:
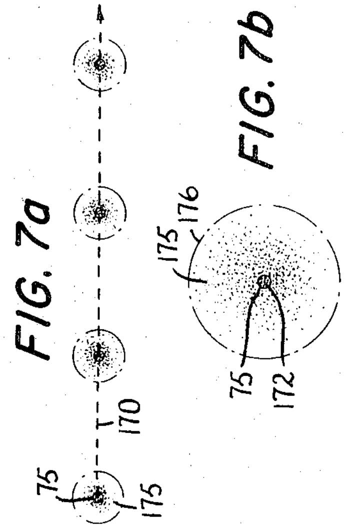

The defocusing method of FIG. 6 provides the same advantages as those described in connection with FIG. 4, the defocusing method likewise producing an average point-to-point illumination of area 175 which progressively decreases from the center 172 of the area to its circumference 176 (FIG. 7*b*). A shortcoming of the FIG. 6 system is that it is difficult to maintain concentricity between the area of blooming of defocused spot 75 and the nominal position in main path 170 of the moving focused spot.

Figures 9A, 9B:
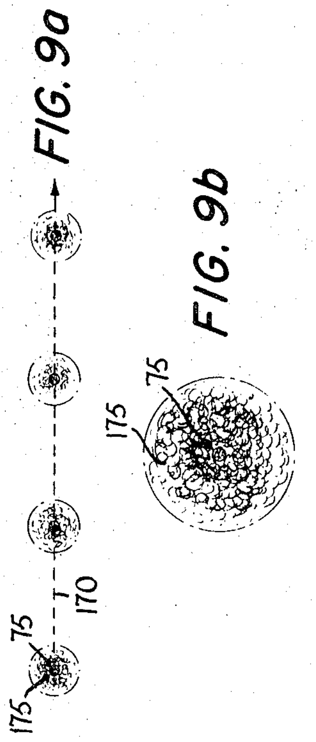

The FIG. 8 system differs from that of FIG. 6 in that the pulses EE (FIG. 5) are fed as gating signals to the gates 252, 253 (as in FIGS. 4) instead of to the focusing control terminal of tube 65. Those normally nonconductive gates are turned "on" by each pulse EE to permit transmission for the pulse period and to the X and Y deflection terminals of tube 65 of noise signals from separate noise generators 272 and 273 coupled to the signal inputs of, respectively, the gate 242 and the gate 243. As a result, during the intermittent intervals of occurrence of the pulses EE, the spot 75 is deflected from its main scanning path 170 to scan randomly over original 40 in an area approximating 175 (FIG. 9*a*). That random scanning produces an average point-to-point illumination of the scanned area which progressively decreases radially outward of the center of the area (FIG. 9*b*).

The FIG. 10 system employs a cathode ray tube 280 providing two electron beams referred to herein as the left beam and the right beam, respectively. The deflection of the left beam is controlled only by the primary deflection signals supplied by leads 59 and 61 from synchronizing unit 50 (FIG. 1). Accordingly, that beam produces on original 40 a focused spot 281 which does only main path scanning in a raster pattern over the original. The right beam is deflected by the same primary deflection signals and produces on original 40 a spot 282 which, for convenience, is shown as being beside spot 281 but which, in practice, maintains concentricity of its nominal position with the spot 281. The operation of tube 280 may be controlled in any of the ways heretofore described (in connection with FIGS. 2, 4, 6 or 8) by signals from a suitable control unit 100 to produce a scanning by spot 282 of the original 40 in an area centered on the main scanning path of spot 281. Preferably, however, those signals from the control unit are modified in relation to the earlier described forms of such signals to render the area scanning of spot 282 continuous rather than intermittent in time.

In the case of the described continuous area scanning of the original, the spot signals derived from the main path scanning by spot 281 and the area signals derived from the area scanning by spot 282 are concurrent signals which appear simultaneously in the common channel means 83 following color analyzer head 80. Therefore, such spot and area signals cannot be separated from each other on the basis that they are time shared. To provide for separation of those signals, the intensity control voltage for the left beam of tube 280 is modulated in modulator 290 by a sine wave output of frequency $f_1$ from an oscillator 291, and the intensity control voltage for the right beam is modulated in modulator 292 by a sine wave output produced by an oscillator 293 and having a frequency $f_2$ substantially different from frequency $f_1$. As a result, the individual intensities of the left and right beam are modulated at frequencies $f_1$ and $f_2$, respectively, and, correspondingly, the spot signals and area signals in channel means 83 are in the form of a modulation on two carriers having frequencies of, respectively, $f_1$ and $f_2$. Those of the mixed together spot and area signal which correspond to, respectively, yellow, magenta and cyan are fed to a separator unit 295 and, in that unit, supplied to, respectively, a pair of band-pass filters 300, 301 a pair of band-pass filters 302, 303 and a pair of band-pass filters 304,305. Of those six band-pass filters in unit 295, the even numbered 300, 302 and 304 are adapted to pass signals having a midfrequency $f_1$ but to reject signals having a substantially different midfrequency. Accordingly, filters 300, 302 and 304 pass the yellow, magenta and cyan spot signals to, respectively, the channels 86*a*, 86*b* and 86*c* (FIG. 1), but those filters prevent the area signals from reaching the spot signal channels. On the other hand, the odd numbered filters 301, 303 and 305 are adapted to pass signals having a midfrequency $f_2$ but to reject signals having a midfrequency substantially different from $f_2$. Therefore, the latter bandpass filters pass the yellow, magenta and cyan area signals to, respectively, the channels 115*a*—115*c* (FIG. 1) but preclude the spot signals from reaching those last named channels. Following their separation, as described, by unit 295, the spot and area signals are demodulated and are then employed in the color separation exposing system in the same way as already described in connection with FIG. 1.

Before leaving the FIG. 10 system, it should be noted that the dual beam tube 280 can, if desired, be replaced by two single beam cathode ray tubes providing two corresponding light spots which are caused by appropriate optical means (not shown) to scan together over the original 40.

The FIG. 11 system is an extension of the FIG. 1 system which enables the exposed color separations to be under the control of a knockout mask. In FIG. 11, the primary deflection signals from synchronizing unit 50 are fed via leads 310 and 311 to an additional single beam cathode ray tube 315 producing on mask 316 a light spot 317. The spot 317 scans over the mask synchronously with both the scanning of original 40 (FIG. 1) by spot 75 and the scanning of films 37*a*—37*d* by beams 36*a*—36*d* and in a raster pattern the same in shape as that by which original 40 and films 37*a*—37*d* are scanned. X and Y deflection gain control knobs 318 and 319 on tube 315 permit adjustment in the size of the raster pattern of scanning of mask 316. Hence, the size ratio between the scanned expanse of mask 316 and the scanned expanse of original 40 and/or the sizes of the color separation images exposed on films 37*a* —37*d* (FIG. 1) is selectively variable by setting of the knobs 318 and 319.

Knockout mask 316 is comprised of color-toned lettering or other details appearing on a more transparent background. As disclosed in copending application Ser. No. 649,621 filed June 28, 1967 in the name of Ross et al. and owned by the assignee hereof, details in different portions of mask 316 are different color tones (including black) to provide different color codings.

The color tone values detected by the scanning of spot 317 over mask 316 are analyzed by a color head 320 similar to head 80 (FIG. 1). Head 320 converts detected color tone values into yellow, magenta and cyan signals fed via leads 321, 322 and 323 to a printing color selector 324 described in detail in the mentioned Ross et al. application. Whenever a detail on mask 316 is being scanned, selector unit 324 supplies signals to gates 325*a*—325*d* to cut off the flow from processor 45 of the yellow, magenta, cyan and black "spot" or image signal to the film exposer 20. Simultaneously, unit 324 is controlled by the relative strengths of the signals on leads 321—323 to select one out of a plurality of possibly selectable color sources 326—329 to provide to film exposer 20 from the selected source a substitute fixed voltage signal for each of the four image signals ordinarily applied to exposer 20 from processor 45. The substitute signals so supplied to exposer 20 from a selected color source are effective to cause exposure on the films 37*a*—37*d* of image portions resulting in the ultimate reproduction in a solid color of the colored detail then being scanned on mask 316. Since any of color sources 326—329 can be adjusted to provide a set of substitute signals of which each signal is selectively adjustable in value, and since each such source is selected for operation by a respective one of the four colors by which separate details on mask 316 are toned, any detail on the mask can (by appropriate color coding thereof) be reproduced in any one of four different colors, and there need not be any significant relation from the color point of view between the color by which the detail is coded and the color in which that detail is reproduced.

The above described embodiments being exemplary only, it is to be understood that additions thereto, modifications thereof, and omissions therefrom can be made without departing from the spirit of the invention, and that the invention comprehends embodiments differing in form and/or details from those which have been specifically described. For example, the invention hereof is applicable to black-and-white reproduction as well as color reproduction. Further, by reducing the diameter of the area scanned to about three times the diameter of the scanning spot, the described area scanning and area signal generation techniques can be used to develop unsharp masking signals and/or edge-peaking signals providing accentuation of tone density edges scanned by the scanning spot. Still further, even when the area scanned is much greater in diameter than the spot in order to generate an area masking signal, concurrent unsharp masking and peaking signals can be produced by the utilization of appropriate data separation techniques.

Accordingly, the invention is not to be considered as limited save as is consonant with the recitals of the following claims.

We claim:

1. In a system in which a visual image is scanned by a spot provided by cathode ray tube means and moving relative to said image in a main scanning path to form a scanning pattern for said image, the improvement comprising, auxiliary scan generator means by which said cathode ray tube means is controlled to scan said image in an area centered on said path and moving there along at the scanning speed of said spot, said area being at least 20 times greater in diameter than said spot, means to convert said main path and area scannings into corresponding spot and area electric signals occurring in common channel means and representative of image tone values detected by, respectively, said main path and area scannings, scan differentiating means by which said main path and area scannings are rendered different in a characteristic enabling said spot and area signals to be electrically distinguished from each other, signal separator means to separate said spot and area signals in said common channel means on the basis of said characteristic and to respectively supply such separated signals to two different channel means, circuit means in said different channel means to electrically process said separated spot and area signals, and means for combining said processed spot and area signals to provide an output corresponding to said spot-detected image values as modified to represent increased contrast between local details of said image and area-size portions thereof which surround and contrast with such details.

2. A system as in claim 1 in which said image is scanned in said area with an intensity of scanning which progressively decreases in the radially outward direction from the center of said area.

3. A system as in claim 1 in which said cathode ray tube means provides a beam which effects both said main path scanning and said area scanning of said image, and in which said image is subjected by said beam to alternate main path and area scannings.

4. A system as in claim 3 in which the time required for an area scanning between consecutive main path scannings is at most substantially equal to the diameter of said spot divided by the scanning speed of said spot over said image.

5. A system as in claim 3 in which the time required for an area scanning between consecutive main path scannings is at most substantially equal to 25 percent of the total time of scanning of said image.

6. A system as in claim 3 in which said scan differentiating means comprising source means of timing signals determinative of separated time intervals during which said image is subjected to area scanning so as to render said spot and area signals in time shared relation in said common channel means, and in which said signal separator means comprises signal switching means operable synchronously with the time-sharing of such signals to switch spot and area signals in said common channel means to one and the other, respectively, of said two different channel means.

7. A system according to claim 6 in which said image is scanned in said whole area during each of said area scan intervals.

8. A system according to claim 7 in which said main path scanning is produced by said beam when in focused condition, and in which said auxiliary scan generator means comprises means responsive to said timing signals to defocus said beam during each of said intervals.

9. A system according to claim 7 in which said auxiliary scan generator means comprises means responsive to each of said timing signals to deflect said beam in orthogonal directions by noise signals.

10. A system according to claim 6 in which said image is scanned in different nonoverlapping portions of said area during successive area scannings of said image.

11. A system according to claim 10 in which said auxiliary scan generator means comprises, means to generate first and second beam deflecting signals during each of said intervals, means to modulate the amplitudes of both said beam deflecting signals so as to produce in each a variation in amplitude over a time spanning a succession of said intervals, and means to apply said first and second modulated beam deflecting signals to one and the other, respectively, of two orthogonal deflection means for said beam.

12. A system according to claim 11 in which said first and second beam deflecting signals are sawtooth signals which are each modulated by a respective one of two sinusoidal signals in quadrature phase relation and each having a period spanning a succession of said intervals, said modulated signals producing scans in said area by said spot which are radial from the center of said area and are progressively displaced angularly around said center.

13. A system according to claim 11 in which said first and second beam deflecting signals are quadrature phased sinusoidal signals and are each modulated by a signal which is monotonically variable in amplitude over said time, said modulated signals producing scans of said image by said spot in the form of ring sectors which are progressively displaced radially relative to the center of said area.

14. A system according to claim 3 further comprising means to increase the intensity of said beam during the area scanning intervals relative to the beam intensity during the main path scanning intervals.

15. A system as in claim 1 in which said cathode ray tube means provides two beams effecting, respectively, said main path and said area scannings of said image.

16. A system as in claim 15 in which said main path and said area scannings of said image are carried out concurrently.

17. A system as in claim 15 in which said scan differentiating means comprises means to intensity modulate said two beams at two different frequencies so as to render said spot and area signals of two different frequencies, and said signal separator means comprises selective filter means disposed to pass said spot and area signals in said common channel means at one and the other of said two frequencies to, respectively, one and the other of said two different channel means.

18. A system as in claim 1 in which said main path scanning of said image is produced by deflection in at least one direction of a beam of said cathode ray tube means, said electric output energizes light means for exposing photosensitive image receptor means moved mechanically in a first direction relative to said light means, and in which said system further comprises means for synchronizing said beam deflection in said one direction with said relative motion in said first direction of said image receptor means.

19. A system as in claim 18 in which said main path scanning is effected by deflection of said beam both in said one direction and in another direction normal to said one direction so as to form a raster scanning pattern for said visual image, said image receptor means is moved mechanically relative to said light means both in said first direction and in a second direction normal to said first direction, and in which said system further comprises means for synchronizing said beam deflection in said other direction with said relative motion of said image receptor means in said second direction.

20. A system as in claim 1 in which said visual image is a color image, said system further comprising color analyzing means to derive from said main path scanning of said image a plurality of different color component spot signals.

21. A system as in claim 20 in which said color analyzing means derives from area scanning of said image a plurality of different color component area signals.

22. A system as in claim 21 in which said different color component area signals are subjected to a processing by which said color component area signals are combined to form a composite area signal, and said composite signal is then combined with each of said different color component spot signals to provide said electric output in the form of said different color component spot signals each modified by said composite area signal.

23. In a system in which a visual image is scanned by a spot provided by a beam of cathode ray tube means and moving in a main path relative to said image to form a scanning pattern for said image, the improvement comprising, means to supplement at intermittent intervals said main path scanning of said spot by a scanning of said image by said spot in a specific portion of an area centered on said main path and moving therealong at the scanning speed of said spot, said area being at least 20 times greater in diameter than said spot, means to progressively displace said scannings of said image in said area during a succession of said intervals so as to produce a cycle of scannings by said spot in said whole area in a time spanning said succession of intervals, and means responsive to said main path and area scannings of said image by said spot to derive from said spot and area scannings, respectively, a first electric signal representative of tone values of said image detected by said main path scanning and a second electric signal representative of tone values of said image detected by said area scanning.

24. A system as in claim 23 in which said supplementing means comprises source means of time-separated sawtooth signals supplied to first and second orthogonal deflection means for said beam to produce during each of said intervals a radial scan by said spot from the center of said area, and in which said progressive displacement effecting means comprises source means of first and second sinusoid signals having a quandrature phase relation and each having a period spanning said succession of intervals, and means to modulate the amplitude of said sawtooth signals supplied to, respectively, said first and second deflection means by, respectively, said first and second sinusoidal signals so as to produce progressive angular displacement around said center of the successive radial scans by said spot.

25. A system as in claim 24 in which each of said sawtooth signals has a triangular waveform divided into leading and lagging sweep and retrace portions of substantially equal duration.

26. A system as in claim 25 further comprising means to increase the intensity of said beam during each sweep portion of each sawtooth waveform and to blank said beam during each retrace portion of said waveform.

27. A system as in claim 24 in which said supplementing means comprises source means of first and second sinusoidal signals phased in quadrature relation and each having a period at most spanning one of said intervals, said first and second signals being respectively supplied during said intervals to first and second orthogonal deflection means for said beam to produce during each of said intervals a scanning of said image by said spot in a ring sector around the center of said area, and in which said means for effecting said progressive displacement comprises source means of a signal which monotonically varies in amplitude over a period spanning said succession of intervals, and means to modulate said first and second sinusoidal signals by said monotonically varying signal so as to produce progressive undirectional displacement in the radial direction relative to the center of said area of successive ones of said ring sector scans.

28. A system as in claim 27 in which said monotonically varying signal is provided by an edge of a sawtooth waveform and in which said ring sector scans of said spot are accordingly sectors of a spiral scanning trace.

29. A system as in claim 28 in which said sawtooth waveform has a retrace portion of short duration relative to the duration of said edge, and in which said sawtooth waveform is phased relative to said ring sector scanning intervals to cause said retrace portion to occur between two consecutive ones of said intervals.

30. A system as in claim 23 in which said first and second electric signals are initially derived in time-shared relation in common channel means, said system further comprising, signal switching means operable synchronously with the occurrence of said intervals to switch said first and second electric signals to first and second outputs, respectively.

31. A system as in claim 23 in which said second electric signal is subject to an integrating action so as to render that signal continuous between said intermittent intervals.

32 in a system in which a visual image is scanned by a spot provided by cathode ray tube means and moving relative to said image in a main scanning path to form a scanning pattern for said image, the improvement comprising, auxiliary scan generator means by which said cathode ray tube means is controlled to supplement at intermittent intervals said main path scanning by a scanning of said image in an area centered on said main path and moving therealong at the scanning speed of said spot, said area being at least 20 times greater in diameter than said spot, means to convert tone values of said image detected by area scannings during said intervals and by main path scanning between said intervals into area and spot electric signals in time-shared relation in common channel means, and signal switching means synchronized with said intervals to switch said time-shared spot and area signals in said common channel means to, respectively, first output means and second output means.

33. In a system in which a visual image is scanned by a spot provided by a beam of cathode ray tube means, the improvement comprising, first and second orthogonal deflection means for said beam, source means of first and second primary beam deflecting signals applied to, respectively, said first and second deflection means to produce a scanning of said image by said spot in a main path forming a scanning pattern for said image, and auxiliary scan generator means coupled to said first and second deflection means to superpose first and second auxiliary beam deflecting signals at intermittent intervals on, respectively, said first and second primary beam deflecting signals, said first and second auxiliary beam deflecting signals being correlated in waveform to produce over a succession of said intervals a scanning of said image by said spot in successive progressively displaced portions of an area centered on said main path and moving therealong at the scanning speed on said spot, said area being at least 20 times greater in diameter than said spot.

34. In a system in which a polychromatic visual image is scanned by a spot moving in a main path relative to said image to form a scanning pattern for said image, the improvement comprising, means by which said image is also scanned over an area centered on said path and moving therealong at the scanning speed of said spot, said area being at least 20 times greater in diameter than said spot, color analyzer means to derive from said main path scanning a plurality of different color component spot signals and to derive from said area scanning a plurality of different color component area signals, said derived spot and area signals being in common channel means and each of said spot and area signals being representative of the corresponding color component of tone values of said image detected by the corresponding mode of scanning, means to separate said spot signals from said area signals and to supply said spot signals and said area signals to, respectively, first and second separate channel means, means to combine said plurality of different color component area signals in said second channel means so as to form a composite area signal, and means to modify each of said plurality of different color component spot signals in said first channel means by said composite area signal.

35. In a system in which a visual image is scanned by a spot provided by cathode ray tube means and moving relative to said image in a main scanning path to form a scanning pattern for said image, and in which the tone values of said image detected by said main path scanning are converted into at least one image signal the improvement comprising, means to effect intermittent progressively displaced sample scannings of said image in an area being at least 20 times greater in diameter than said spot and moving relative to said image along said path, means to convert tone values of such image detected by such intermittent scannings into corresponding values of intermittent signals, intergrating means to convert such intermittent signals into a continuous signal, and means to modify said image signal by said continuous signal.

36. In a system in which a visual image is scanned by a spot provided by cathode ray tube means and moving relative to said image in a main scanning path to form a scanning pattern for said image, and in which tone values of said image detected by said main path scanning are converted into corresponding first signal values the improvement comprising, sensitized image receptor means, light means disposed to expose an image on said receptor means by a scanning of said receptor means synchronously with the main path scanning of said visual image by said spot, means to control by said first signal values the exposing action of said light means, means to effect by cathode ray tube means a detection of tone values by a scanning other than said main path scanning and to convert such tone values detected by such other scanning into corresponding second electric signal values, and means to further control said exposing action of said light means by said second electric signal values.

37. In a system in which a visual image is scanned by cathode ray tube means, and in which the tone values detected by such scanning are converted into corresponding first electric signal values, the improvement comprising, image receptor means, light means to expose an image on said receptor means by a scanning of said receptor means synchronized with said scanning of said visual image by said cathode ray tube means, additional cathode ray tube means to scan tonal details other than those provided by said visual image, said last named scanning being synchronized with said scanning of said image receptor means by said light means, means to derive second electric signal values corresponding to said details from such scanning of said details, and means to selectively control said exposing action of said light means by one at a time of said first electric signal values and second electric signal values so as to produce exposure on said receptor means of image portions derived from, selectively, said visual image and said details.